Feb. 17, 1931.  O. B. FÖRSTER  1,793,169
AUTOMATIC WEIGHING APPARATUS
Filed June 18, 1928   3 Sheets-Sheet 1
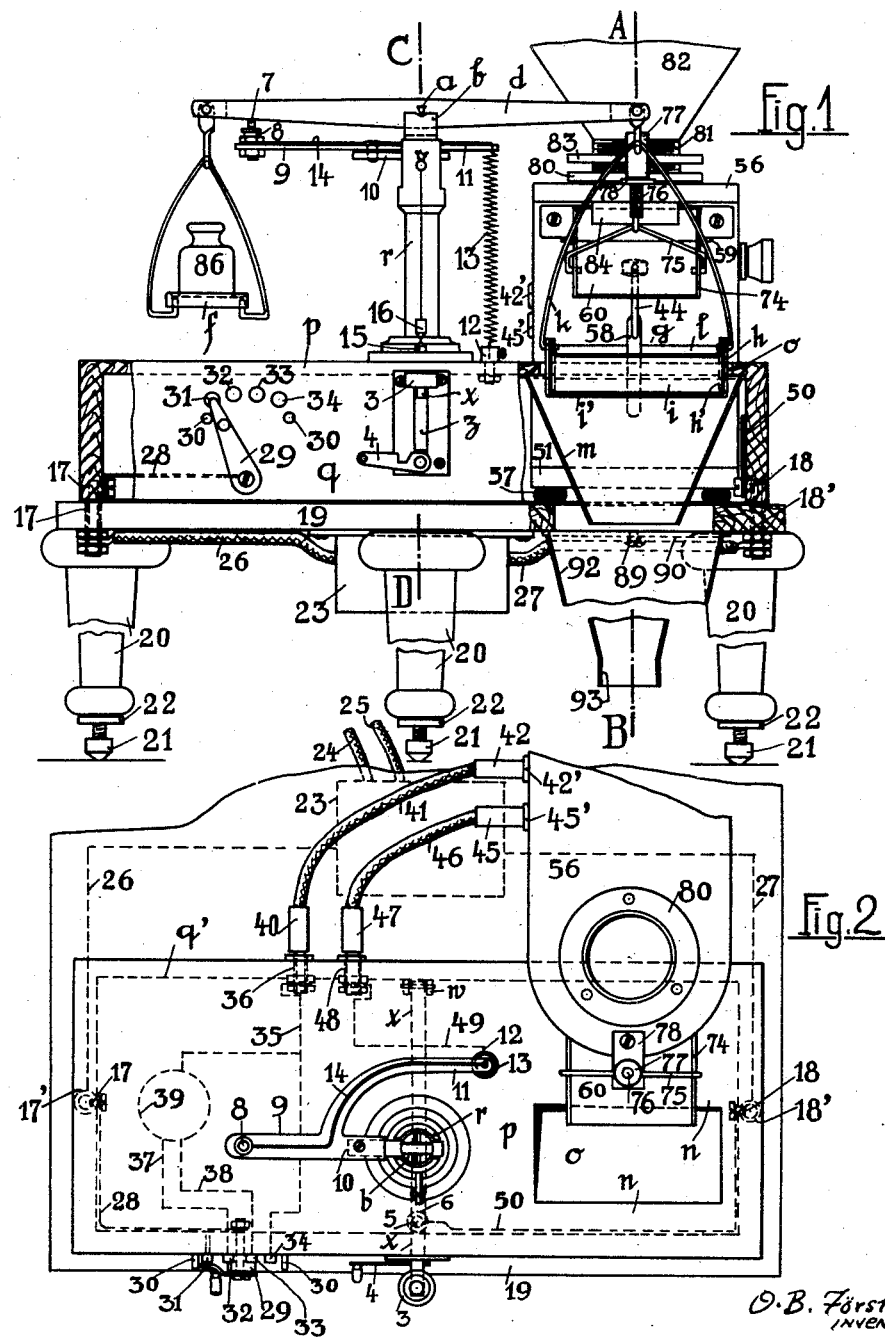

Feb. 17, 1931.    O. B. FÖRSTER    1,793,169
AUTOMATIC WEIGHING APPARATUS
Filed June 18, 1928    3 Sheets-Sheet 2
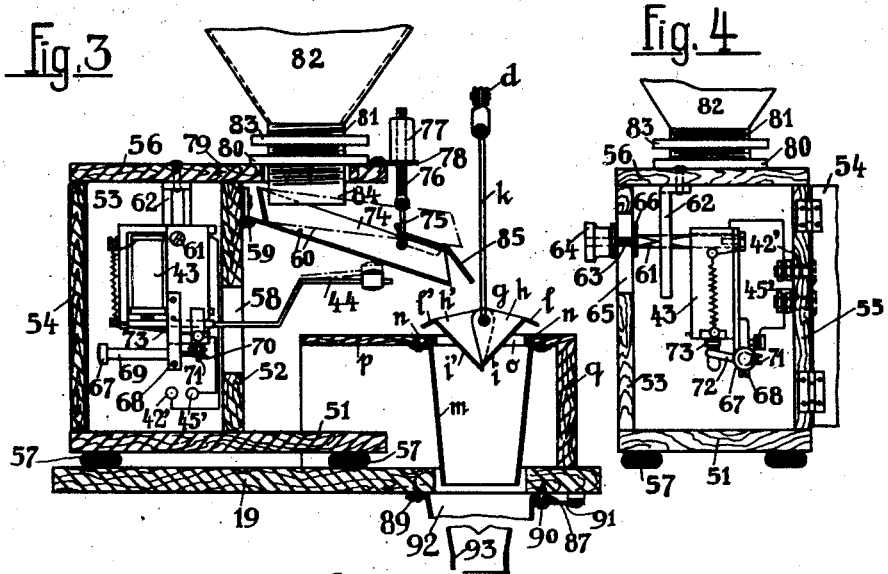
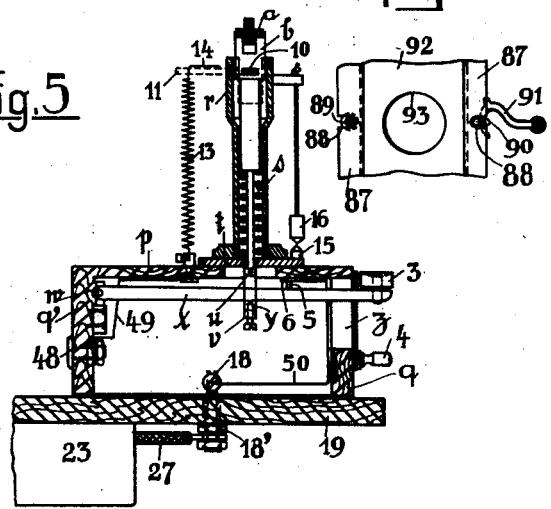
O. B. Förster
INVENTOR
By: Marks & Clerk
Att'ys.

Patented Feb. 17, 1931

1,793,169

UNITED STATES PATENT OFFICE

OSWALD BRUNO FOERSTER, OF NUREMBERG, GERMANY

AUTOMATIC WEIGHING APPARATUS

Application filed June 18, 1928, Serial No. 286,185, and in Germany July 7, 1927.

The invention relates to a device for the automatic weighing out of definite quantities of goods and for subsequently filling the same into their packages. As goods, there come into consideration here only those which admit of being caused to travel by shaking a chute, that is, in the first place, granular goods (seeds, pepper corns, cloves) or pulverulent goods, (bronze, gun powder, saffron, medicaments) or small wire goods (nails, sewing needles, pins, talking-machine needles, office fasteners) or wire and metal goods (drawing pins, press studs) or pure, small metal and sheet-metal goods (spangles).

The invention consists essentially in the combination of a pillar scale beam with a beam-carrying column capable of being lowered, and a pivoted tray, which, when the beam-carrying column is lowered, is emptied by its marginal flanges coming into contact with a tray-charging chute to be vibrated by means of a magnetic hammer, in such a manner that during the descent of the charged pivoted tray under its excess weight, the chute is stopped by the opening of a circuit contact and during the descent of the beam-carrying column a second circuit contact is opened, and consequently a fresh shaking of the chute is permitted, not directly by the closing of the first contact in consequence of the raising of the still open tray by the weighing weight, but only after the closing of the second contact also and of the tray when the beam-carrying column rises again.

With this device the weighing out of the desired quantities of goods is effected without loss of goods or injury to the receiver of the packed goods, accurately and without loss of time, because during the time of filling of the pivoted tray the fresh packing wrapper can be placed under the filling shaft and the package previously filled can be closed.

One constructional example of the new device is illustrated in the accompanying drawings, wherein Fig. 1 shows the apparatus partly in front elevation and partly in sectional elevation, and Fig. 2 shows a plan of the device, with the scale beam removed.

Fig. 3 shows in sectional elevation on the line A—B in Fig. 1 the pivoted tray, the vibrating chute, the magnetic hammer and its relay.

Fig. 4 shows the relay and its support from the rear with the relay frame opened.

Fig. 5 is a sectional elevation on the line C—D in Fig. 1, to illustrate the device for lowering and raising the beam-carrying column.

Figure 6:
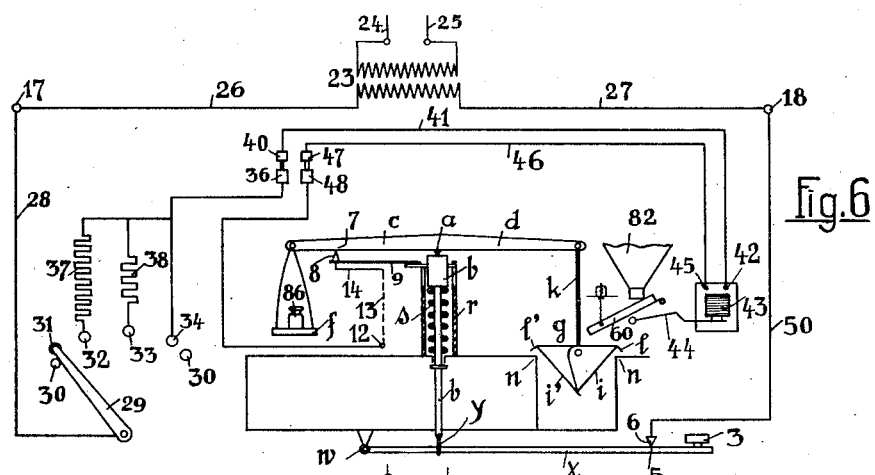
Figs. 6 to 8 are diagrams of the circuits and of the two contact devices.
Figure 7:
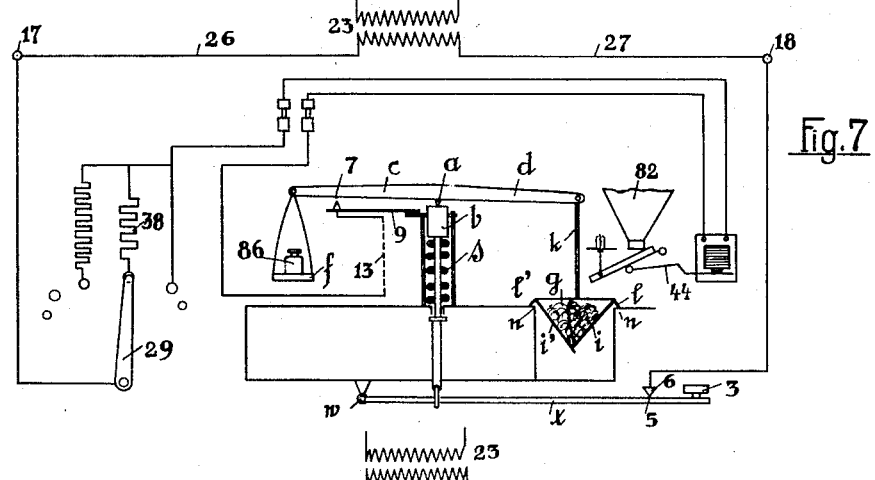

Fig. 6 showing the apparatus during the filling,

Fig. 7 immediately after the filling has been effected, and

Figure 8:
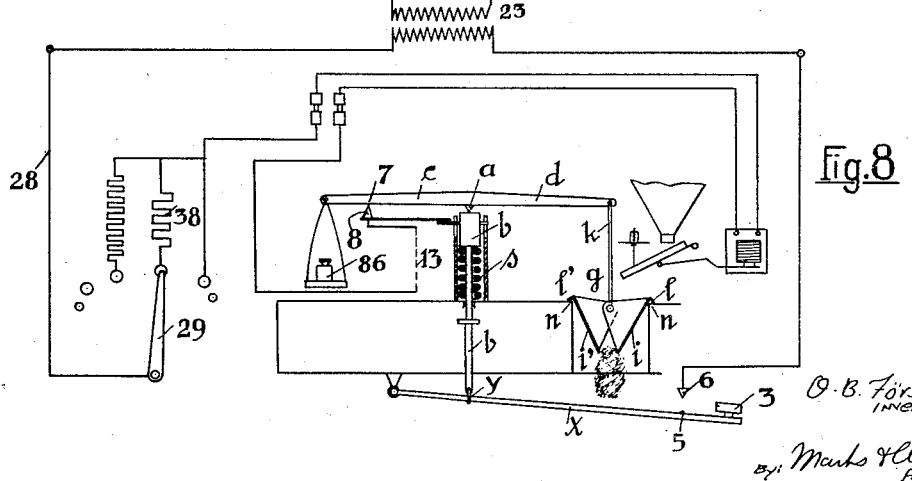

Fig. 8, during the emptying of the pivoted tray.

Both the weighing apparatus and the vibrating chute are new, but the object in view is not attained either by the weighing device alone or by the vibrating chute alone, but only by the combination of the two devices, which are in themselves new, in the manner hereinbefore described.

By means of knife edges $a$ there rests upon a beam-carrying column $b$ a scale beam $c$, $d$, of which the left arm $c$ carries a weight pan $f$, and the right arm $d$ carries a pivoted tray $g$, in equilibrium. The pivoted tray $g$ consists of two hinged members, which form its end wall members $h$, $h'$ and its oblique bottoms $i$, $i'$, and of which the end members $h$, $h'$ are so pivoted to its curved supporting member $k$ that the lower edge of the one oblique wall $i$ is pressed against the other oblique wall $i'$. The weight of outwardly and downwardly bent marginal flanges $l$, $l'$ at the outer edges of the hinged members assist in keeping the tray closed. These flanges also serve however for opening the tray when the latter is lowered further into a discharge shaft $m$, for the marginal flanges then strike against the edges $n$ of an aperture $o$ in the cover $p$ of a weighing box $p$, $q$. Underneath the discharge shaft $m$ is arranged a filling hopper 92, the mouthpiece 93 of which is adapted to the crosssectional shape of the package to be filled with the weighed materials.

For the lowering of the pivoted tray the beam-carrying column $b$ is slidably mounted upon a helical spring $s$ in a pillar sleeve $r$, and provided underneath the footplate $t$ of the pillar with a curved member $v$, which is pivoted at $u$, and which embraces a lever $x$ pivoted at $w$ to the rear wall $q'$ of the box and supports the lever $x$ through the medium of an adjusting screw $y$. The lever $x$ extends through a vertical slot $z$ in the front wall of the box and carries, outside the latter, a knob 3, by which it can be rocked downwards for the purpose of drawing down the beam-carrying column $b$. A rocking bar 4 enables the lever $x$ to be locked in its lowest position. When the unlocked lever is rocked upwards by the spring $s$, a platinum pin 5 on the lever strikes against a fixed stop 6 underneath the top of the box. The members 5 and 6 form together the second contact. The first contact is formed by a platinum pin 7 mounted on the under side of the scale beam $c$ and a contact screw 8. The latter is mounted in an arm 9 consisting of insulating material, which is fixed on to a metal arm 10 carried by the beam-carrying column. To an insulating arm 11 branching rearwards from the insulating arm 9 is attached the upper end of a helical spring 13, and to a terminal 12 screwed to the box top $p$ is attached the lower end of the spring. By a conductor 14 passing over the insulating arm 9, 11 the contact 8 is connected with the helical spring.

A plummet 16 moving in relation to an adjusting tip 15 enables the vertical adjustment of the beam-carrying column to be verified. For the purpose of obtaining this adjustment, the weighing box $p$, $q$ is provided with plug pins 17 and 18 upon contact sockets 17' and 18' in a table top 19, which stands upon three legs 20, with adjusting screws 21 and lock nuts 22, and is adjustable horizontally by rotating these adjusting screws. To the under side of the table top 19 is attached a box 23, which contains for alternating current a transformer and for continuous current a carbon filament resistance or an accumulator. Cables 24 and 25, which are plugged at one end to a plug box cover of the house wiring, are plugged to the transformer, which reduces the 110 or 220 volts of the supply considerably, to 8 volts for example. From the transformer a conductor 26 leads to the plug socket 17' and a conductor 27 to the plug socket 18'. From the plug pin 17 (compare Figs. 6, 7 and 8) a conductor 28 passes to a rockable switch arm 29, which can be adjusted, between two stops 30, on to studs 31, 32, 33 and 34. The stud 31 is not connected to any conductor, and the stud 34 is connected directly to a conductor 35, which leads to a plug socket 36, mounted in the rear wall $q'$ of the weighing box. Between the conductor 35 and the stud 32 is interposed a high resistance 37, which reduces the voltage, for example to 3 volts, while a resistance 38 inserted between the stud 33 and the conductor 35 only chokes down the voltage to 5 volts. The different resistances may be wound upon a coil 39 (Fig. 2). From a plug 40 inserted in the plug socket 36 a conductor 41 leads to a plug 42, and through the known electrical device 43 of a magnetic hammer 44 back to a plug 45, from which a conductor 46 leads to a plug 47. A plug socket 48, into which the plug socket 47 is inserted, is connected through a conductor 49 to the terminal 12, and thereby to the helical spring 13, from which the current flows through the conductor 14, through the closed contacts 8 and 7, through the arm $c$ of the scale-beam through the beam-carrying column $b$, through its lowering lever $x$, through the closed contacts 5 and 6, and through a conductor 50 to the plug 18, and from the latter through the conductor 27 to the transformer 23, and to the cable 25 from the house mains.

To the right at the rear of the back wall of the weighing box is omitted and, on this account, as shown in Fig. 3, the foot plate 51 of a box 51, 52, 53, 54, 55, 56, which receives the electrical device 43 of the magnetic hammer break, can be partly slipped in under the weighing box. This foot plate 51 is mounted with india rubber feet 57 upon the table top 19. Through a slot 58 in the front wall 52 of the hammer box, the hammer 44 extends forwards underneath the bottom 60 of a chute 60, 74, pivoted at 59 to the box wall 52. The right-hand side wall 55, as seen in Figure 4 from the back, receives plug sockets 42' and 45' for the plugs 42 and 45. The entire magnetic hammer 43, 44 is carried by a rectangular pin 61, which is guided in a fork 62 projecting downwards from the top 56 of the box, and is adjustable in level in a slot 65 in the side wall 53 of the box, by means of a screw-threaded part 63 of the pin 61, when a nut 64 thereon is loosened. When the nut 64 is tightened up, the pin 61 is drawn firmly against a washer 66, while rotation of the pin 61 is prevented by the guide fork 62. By loosening, shifting and retightening the nut 64, the distance of the hammer 44 from the chute bottom 60 can thus be coarsely adjusted quickly. The fine adjustment of the hammer is effected by rotating a handle 67 (which can be freely gripped when the box door is opened) on a rotary pin 69, which is journalled in a bar 68 and which engages with its eccentrically bent end 70 in the fork 71 of a forked contact lever 72 for the armature spring 73.

The chute 60, 74 is carried by means of a bent member 75 engaging in its side wall 74, a screw 76 gripping the said bent member, a nut 77 and a carrying ledge 78 supporting the latter. By rotating the nut to the right the chute is raised, and by rotating same to the left it is lowered. The part of the box top 56 projecting over the rear part of the chute has an aperture 79, and, screwed on to the margin thereof, a ring nut 80 with a fine thread, into which the screw-threaded pipe union 81 of a storage hopper 82 is screwed. A ring nut 83 serves as a lock nut for locking the outlet margin 84 of the pipe union 81 in relation to the chute bottom 60. A loosely mounted flap 85 engaging behind the curved carrying member 75 and round the side wall 74 of the chute guides the material slipping down from the chute into the pivoted tray $g$.

For regulating the quantity and speed of the material sliding down the chute the following adjustings are therefore available:—

(a) Adjusting the level of the hopper mouth 84 in relation to the chute bottom 60 by screwing the storage hopper 82 up and down;

(b) Adjusting the inclination of the chute bottom by rotating the chute-carrying nut 77 to right or left;

(c) Correspondingly adjusting the hammer 44 in relation to the adjusted chute bottom by loosening, shifting and retightening the clamping nut 64 of the carrying pin 61 of the electrical hammer device 43, 44;

(d) Adjusting the hammer armature in relation to the core of the electromagnet by rotating the rearwardly projecting rotary pin 67, 69 which engages with its bent end 70 in the fork 71 of the contact lever 72 for the armature spring 73; and (e) Adjusting the strength of the hammer blows by energizing the electromagnets with current at different voltages by rotating the adjusting lever 29 for the resistances.

The adjustment is preferably such that the weight of material determined by a weight 86 placed in the scale pan $f$ is delivered into the pivoted tray during the time required for closing the package previously filled.

The apparatus operates as follows (see Figs. 6, 7 and 8):—In the position according to Fig. 6, in which the pivoted tray $g$ is still empty and the switch lever 29 is adjusted upon the unconnected stud 31, the first contact 7, 8 is closed owing to the weight 86 holding down the left arm $c$ of the scale beam, and the second contact 5, 6 by the stress in the spring $s$. By shifting the lever 29 on to any one of the resistance studs 32, 33 and 34 the circuit is closed, and the selection of the particular stud determines the force with which the hammer 44 strikes from below against the chute floor 60. It strikes the more strongly the smaller the resistance inserted. Upon the desired filling of the tray $g$ being attained, the latter sinks somewhat. The contact 7, 8 is thereby opened and the working of the magnetic hammer interrupted. No further material slides down. The flanges $l$ and $l'$ of the flaps $i$ and $i'$ are still suspended somewhat above the edges $n$. They may rest gently upon the latter as shown in Fig. 7. The opening of the tray bottom is not thereby effected. For the opening thereof, the depression of the knob 3 is required. Hence the contact 7, 8 closes again, in consequence of the resistance which the flaps $i$, $i'$ at first still oppose to the opening thereof. If there were not already, from the first moment of the depression of the knob 3, an interruption of the circuit at the lever contact 5, 6, the hammer would come into operation again and would deliver excess material into the tray previously closed. During the further depression of the knob 3, the curved tray-carrying member $k$ presses the joints of the flaps $i$, $i'$ down, while their flanges $l$, $l'$ still bear upon the abutment edges $n$. The tray bottom is thereby rocked up, and the material emptied through a filling hopper 92, 93 into the package placed under the mouthpiece 93 thereof. The emptying is normally already effected before the contact lever $x$ mounts upon its lower abutment in order that the tray bottom may still be able to open quite wide until the contact lever mounts, in order to allow even the most unwieldy material to fall through. Upon the relaxation of the pressure upon the lever knob 3, the lever $x$ is raised by the spring $s$, which also presses upwards the scale-beam carrying column $b$ together with the scale beam and its load, and the second contact 5, 6 is thereby closed again; but this only happens an appreciable time after the tray bottom has closed again. The current now flows again through the electrical device 43 of the magnetic hammer 44, the latter operates again, and the filling of the tray recommences.

The apparatus admits of being easily and quickly erected by any trader. The table 19, 20 (Fig. 1) is mounted upon a fixed securely standing packing table. Hereupon the weighing box $p$, $q$, by means of its plugs 17 and 18, is mounted upon the table top 19, and by rotating the foot screws 21 the scale-beam carrying column $b$ is adjusted into a vertical position, as verified by the play of the plummet 16 above the marking point 15.

Upon the column $b$ is mounted the scale beam $c$, $d$; and the relay casing 51 to 56, with its projecting bottom, is slipped from the back into the weighing box and so adjusted that the chute opens above the pivoted tray $g$. The storage hopper 82 is then screwed on. The plug of the cable 24, 25, already connected to the transformer 23, is now inserted into the plug socket of the house mains. By inserting the plugs 40, 42 and 45, 47 of the cables 41 and 46, the electrical apparatus of the weighing box is connected with that of the relay casing. After the filling of the storage hopper and after the adjustment of the correct travel of the material, the apparatus can be quite easily operated by the cheapest operatives, such as female packers.

The latter need only attend to the opening of the scale-beam contact, depress the knob 3 after the opening of this contact, replace the filled package under the filling hopper 92, 93 by a package to be filled and let the knob go back. If the putting under of a fresh package takes rather a long time, the pressure knob 3 can be held down temporarily by rocking in the bar 4 over the press knob lever $x$.

If packages with other filling apertures come in their turn, a different filling hopper 92 with a suitably shaped mouthpiece 93 is inserted. For quick changing, the hopper flange 87 has notches or slots 88 arranged opposite to one another. The notch 88 on one side engages under the head of a screw 89 and the notch 88 on the other side engages with the ring 90 of a ring-headed screw. By passing a pivoted hook 91 into the ring 90 the hopper flange 87 is locked.

Without departing from the idea of the invention the apparatus might undergo many constructional modifications. Thus the contact 7, 8 might be arranged above the right-hand scale beam $d$ instead of under the left-hand scale beam $c$. For the lowering of the beam-carrying column $b$ the arranging of an oscillatable contact lever $x$ with press knob 3 is not absolutely essential, although this arrangement is the most convenient, on account of the simplicity of actuating the knob and the convenience of its position in front of the weighing box. The lowering of the column $b$, with opening of a contact 5, 6 to be arranged either below or above the latter, might also be effected by direct depression of the part of the column projecting above the pillar sleeve $r$, or of a curved member to be mounted upon the said part, embracing the scale beam with clearance. Finally, differently constructed pivoted scale pans for goods, opening and emptying themselves when the beam-carrying column descends, could be employed, though the one illustrated appears to be the simplest, cheapest and most reliable.

It would also be possible to supply the entire plant undismountably, but the manufacture and supply thereof in a plurality of main parts capable of being individually manufactured and tested and of being easily assembled by the purchaser is to be preferred for transport purposes and for storage in a restricted space.

In the diagrams of connections according to Figs. 6, 7 and 8, the chute is located at the side of the weighing box, and the pivoted tray is turned through 90° as compared with its arrangement according to the previous figures. This is primarily only done to facilitate illustration of the influence of the lowering of the carrying column $b$ and of the play of the scale beam upon the opening and closing of the pivoted tray. From this it also follows however that this arrangement would also be possible within the scope of the invention.

What I claim is:—

1. The combination with a weighing and package-filling apparatus of an automatically controlled adjustable feeding device, said combination comprising a scale beam, a vertically movable column carrying the scale beam, a pivoted tray suspended from one arm of the scale beam, means for lowering the beam-carrying column, marginal flanges on the pivoted tray, said marginal flanges being adapted to open the pivoted tray and to allow its contents to escape when their descent is stopped, an abutment adapted to actuate said marginal flanges when the pivoted tray descends, and adjustable vibrating chute for supplying material to be weighted to the pivoted tray, and adjustable magnetic-hammer for vibrating the chute, the electric circuit of said hammer including two contacts in series, one of said contacts being arranged in the way of the scale beam and adapted to open as soon as the arm of the scale beam carrying the pivoted tray begins to descend, and the other of said contacts being arranged in the way of the vertically movable column and adapted to be opened whenever the beam-carrying column is lowered.

2. Automatic weighing and package-filling apparatus, comprising a scale-beam, a vertically movable column carrying the scale beam, a weighing box formed with a vertical slot in its front wall, a pillar sleeve mounted on the top of the weighing box and enclosing and guiding the beam-carrying column, a helical spring enclosed in the pillar sleeve underneath the beam-carrying column, constantly tending to push the beam-carrying column upwards, a downward extension of the beam-carrying column passing through the helical spring and the top of the weighing box, a supporting member pivotally suspended from the lower end of said downward extension, a contact lever pivoted at one end to the rear wall of the weighing box, supported at an intermediate point on said supporting member, and extending forward to the exterior through the vertical slot in the front wall of the box so that it can be manually depressed for the purpose of lowering the beam-carrying column, adjusting means mounted in the supporting member for adjusting the vertical position of the contact lever in relation to the supporting member, a pivoted tray suspended from one arm of the scale beam, a chute for supplying material to be weighed to the pivoted tray, a magnetic hammer for vibrating the chute, the electric circuit of the hammer including a series contact adapted to open as soon as the arm of the scale beam carrying the pivoted tray begins to descend, a contact pin mounted on the contact lever, and a contact plate secured to the under side of the top of the weighing box and adapted to make contact with the contact pin only when the contact lever is in its uppermost position, said contact being in series with the electric circuit of the magnetic hammer and also with the aforementioned series contact.

3. Automatic weighing and package-filling apparatus, comprising a scale-beam, a vertically movable column carrying the scale beam, a weighing box, an electrical terminal mounted on the top of the weighing box, a pillar sleeve mounted on the top of the weighing box and enclosing and guiding the beam-carrying column, a pivoted tray suspended from one arm of the scale beam, means for lowering the beam-carrying column, a chute for supplying material to be weighed to the pivoted tray, a magnetic hammer for vibrating the chute, a contact pin carried by the scale beam, an insulating arm on the beam-carrying column, a contact pin carried by said insulating arm, and adapted to co-act with the contact pin carried by the scale beam, a resilient electrical conductor connected at one end with the contact pin carried by the insulating arm and at the other end with the terminal on the top of the weighing box, the electric circuit of the hammer including said contact pins in series, so that the said circuit is opened whenever the arm of the scale beam carrying the pivoted tray begins to descend.

4. Automatic weighing and package-filling apparatus, comprising a scale-beam, a vertically movable column carrying the scale beam, means for lowering the beam-carrying column, two flaps forming the end walls and oblique bottoms of a pivoted tray, a carrying member for suspending the pivoted tray from one arm of the scale beam, the flaps being so pivoted to the carrying member that when the tray is hanging freely the lower edge of one oblique bottom bears against the other oblique bottom, marginal flanges on the pivoted tray, said marginal flanges being adapted to open the pivoted tray and allow its contents to escape when their descent is stopped, an abutment adapted to actuate said marginal flanges when the pivoted tray descends, a chute for supplying material to be weighed to the pivoted tray, and a magnetic hammer for vibrating the chute, the electric circuit of the hammer including two contacts in series, one of said contacts being adapted to open as soon as the arm of the scale beam carrying the pivoted tray begins to descend, and the other of said contacts being opened whenever the beam-carrying column is lowered.

5. In automatic weighing and package-filling apparatus a vibratable chute pivoted at the rear end, a carrying member attached to the chute near the front end of the chute, a fixed supporting ledge, an adjusting screw attached at its lower end to the upper end of the chute-carrying member and extending upwards through the fixed supporting ledge, and a nut engaging with the adjusting screw and supported by the fixed supporting ledge, so that the inclination of the chute can be varied by rotating the nut.

6. In automatic weighing and package-filling apparatus a vibratable chute, an internally screw-threaded ring nut fixed in a horizontal position, above the vibrating chute, a rotatable storage hopper, an externally screw-threaded discharge nozzle on said storage hopper, said nozzle engaging with the ring nut, so that by rotating the hopper the distance between the nozzle outlet and the bottom of the chute can be adjusted at will.

7. In automatic weighing and package-filling apparatus a vibrating chute, means for varying the inclination of the chute, a magnetic hammer for vibrating the chute, by striking against the bottom of the chute, a hammer box enclosing the magnetic hammer, the hammer box being formed with a vertical slot in its side wall, a rectangular pin secured to the magnetic hammer to support it and extending outwards to the vertical slot, a screw-threaded extension of the rectangular pin passing through the vertical slot, a washer mounted on the pin between the rectangular part and the screw-threaded part, a clamping nut engaging the outer end of the pin, and a fork secured to the hammer box and engaging the rectangular pin to prevent it from rotating, so that the magnetic hammer as a whole can be raised or lowered after loosening the nut and clamped in position again after being shifted.

8. In automatic weighing and package-filling apparatus a vibrating chute, a magnetic hammer for vibrating the chute, a hammer box enclosing the magnetic hammer break, a door at the back of the hammer box, a pin rotatably mounted on the magnetic hammer, said pin being accessible from the rear for manual rotation when the door at the back of the hammer box is open, the inner end of the pin being bent eccentrically, an armature plate spring forming part of the magnetic hammer, and a two-armed contact lever for the armature plate spring, one arm of said contact lever being forked, and the eccentrically bent end of the pin engaging between the prongs of the forked arm of the lever to enable a fine adjustment of the position of the hammer of the magnetic hammer to be effected.

9. In automatic weighing and package-filling apparatus a vibrating chute, a magnetic hammer for vibrating the chute, contact studs, resistances of various magnitudes connected to the contact studs, and a switch lever movable over the contact studs to insert the various resistances in the electric circuit of the magnetic hammer to regulate the force of the hammer blows.

10. In automatic weighing and package-filling apparatus, filling hoppers, a flange at the upper edge of each of the filling hoppers, the flanges being formed with two notches diametrically opposite to one another, a table on which the weighing apparatus is mounted, the table top being formed with an aperture through which the weighed material is discharged, and means for suspending a filling hopper beneath the aperture in the table top in a readily detachable manner, said suspending means comprising a headed projection, such as a screw, extending downwards from the table top and adapted to engage with one of the notches in the flange of a filling hopper, a ring extending downwards from the table top and adapted to pass through the other notch in the flange of the filling hopper, and a pivotally mounted locking member adapted to be passed through said ring after the ring has been passed through the notch, so as to lock the filling hopper in position.

11. Automatic weighing and package-filling apparatus, comprising a table on which the weighing apparatus is mounted, levelling screws in the feet of the table for levelling the table top, plug sockets in the table top, a weighing box, plugs secured to the under side of the weighing box, said plugs being adapted to be removably inserted in the sockets in the table top, both for positioning purposes and for establishing electrical connections, a chute for supplying material to be weighed to the weighing apparatus, a magnetic hammer for vibrating the chute, a hammer box enclosing the magnetic hammer, the hammer box being supported upon the table top independently of the weighing box, and the chute being pivoted at its rear end to the front wall of the hammer box, and plug cables for establishing electrical communication between the weighing box and the hammer box.

12. Automatic weighing and package-filling apparatus, comprising a scale-beam, a vertically movable column carrying the scale beam, a scale pan suspended from one arm of the scale beam, a chute for supplying material to be weighed to the scale pan, a magnetic hammer for vibrating the chute, a contact pin carried by the scale beam, an insulating arm on the beam carrying column, a contact pin carried by said insulating arm, and adapted to co-act with the contact pin carried by the scale beam, the electric circuit of the hammer including said contact pins in series, so that the said circuit is opened whenever the arm of the scale beam carrying the scale pan begins to descend, resilient means constantly tending to urge the beam-carrying column upwards, a supporting member suspended from the beam-carrying column, a contact lever pivoted at one end, supported at an intermediate point on said supporting member, and adapted to be manually depressed at the other end for the purpose of lowering the beam-carrying column, the electric circuit of the hammer including a contact pin mounted on the contact lever, and a fixed contact member adapted to make a contact with said last-mentioned contact pin only when the contact lever is in its uppermost position, said contact being in series with the electric circuit of the magnetic hammer and also with the aforementioned series contact.

13. Automatic weighing and package-filling apparatus, comprising a scale-beam, a vertically movable column carrying the scale beam, a scale pan suspended from one arm of the scale beam, a chute for supplying material to be weighed to the scale pan, the chute being pivoted at the rear end, a carrying member attached to the chute near the front end of the chute, a fixed supporting ledge, an adjusting screw attached at its lower end to the upper end of the chute-carrying member and extending upwards through the fixed supporting ledge, and a nut engaging with the adjusting screw and supported by the fixed supporting ledge, so that the inclination of the chute can be varied by rotating the nut, resilient means constantly tending to urge the beam-carrying column upwards, means for lowering the beam-carrying column, and a magnetic hammer for vibrating the chute, the electric circuit of the hammer including two contacts in series, one of said contacts being adapted to open as soon as the arm of the scale beam carrying the pivoted tray begins to descend, and the other of said contacts being opened whenever the beam-carrying column is lowered.

14. Automatic weighing and package-filling apparatus, comprising a scale-beam, a vertically movable column carrying the scale beam, a scale pan suspended from one arm of the scale beam, a chute for supplying material to be weighed to the scale pan, an internally screw-threaded ring nut fixed in a horizontal position, above the vibrating chute, a rotatable storage hopper, and an externally screw-threaded discharge nozzle on said storage hopper, said nozzle engaging with the ring nut, so that by rotating the hopper the distance between the nozzle outlet and the bottom of the chute can be adjusted at will, resilient means constantly tending to urge the beam-carrying column upwards, means for lowering the beam-carrying column, and a magnetic hammer for vibrating the chute, the electric circuit of the hammer including two contacts in series, one of said contacts being adapted to open as soon as the arm of the scale beam carrying the pivoted tray begins to descend, and the other of said contacts being opened whenever the beam-carrying column is lowered.

15. Automatic weighing and package-filling apparatus, comprising a scale-beam, a vertically movable column carrying the scale beam, a scale pan suspended from one arm of the scale beam, a chute for supplying material to be weighed to the scale pan, means for varying the inclination of the chute, a magnetic hammer for vibrating the chute, by striking against the bottom of the chute, a hammer box enclosing the magnetic hammer, the hammer box being formed with a vertical slot in its side wall, a rectangular pin secured to the magnetic hammer to support it and extending outwards to the vertical slot, a screw-threaded extension of the rectangular pin passing through the vertical slot, a washer mounted on the pin between the rectangular part and the screw-threaded part, a clamping nut engaging the outer end of the pin, a fork secured to the hammer box and engaging the rectangular pin to prevent it from rotating, so that the magnetic hammer as a whole can be raised or lowered after loosening the nut and clamped in position again after being shifted, resilient means constantly tending to urge the beam-carrying column upwards, and means for lowering the beam-carrying column, the electric circuit of the hammer break including two contacts in series, one of said contacts being adapted to open as soon as the arm of the scale beam carrying the pivoted tray begins to descend, and the other of said contacts being opened whenever the beam-carrying column is lowered.

16. Automatic weighing and package-filling apparatus, comprising a scale beam, a vertically movable column carrying the scale beam, a scale pan suspended from one arm of the scale beam, a chute for supplying material to be weighed to the scale pan, a magnetic hammer for vibrating the chute, a hammer box enclosing the magnetic hammer, a door at the back of the hammer box, a pin rotatably mounted on the magnetic hammer, said pin being accessible from the rear for manual rotation when the door at the back of the hammer box is open, the inner end of the pin being bent eccentrically, an armature plate spring forming part of the magnetic hammer, a two-armed contact lever for the armature plate spring, one arm of said contact lever being forked, and the eccentrically bent end of the pin engaging between the prongs of the forked arm of the lever to enable a fine adjustment of the position of the hammer of the magnetic hammer to be effected, resilient means constantly tending to urge the beam-carrying column upwards, and means for lowering the beam-carrying column, the electric circuit of the hammer including two contacts in series, one of said contacts being adapted to open as soon as the arm of the scale beam carrying the pivoted tray begins to descend, and the other of said contacts being opened whenever the beam-carrying column is lowered.

17. Automatic weighing and package-filling apparatus, comprising a scale-beam, a vertically movable column carrying the scale beam, a scale pan suspended from one arm of the scale beam, a chute for supplying material to be weighed to the scale pan, resilient means constantly tending to urge the beam-carrying column upwards, means for lowering the beam-carrying column, a magnetic hammer for vibrating the chute, the electric circuit of the hammer including two contacts in series, one of said contacts being adapted to open as soon as the arm of the scale beam carrying the pivoted tray begins to descend, and the other of said contacts being opened whenever the beam-carrying column is lowered, contact studs, resistances of various magnitudes connected to the contact studs, and a switch lever movable over the contact studs to insert the various resistances in the electric circuit of the magnetic hammer to regulate the force of the hammer blows.

18. Automatic weighing and package-filling apparatus, comprising a scale-beam, a vertically movable column carrying the scale beam, a scale pan suspended from one arm of the scale beam, a chute for supplying material to be weighed to the scale pan, resilient means constantly tending to urge the beam-carrying column upwards, means for lowering the beam-carrying column, a magnetic hammer for vibrating the chute, the electric circuit of the hammer including two contacts in series, one of said contacts being adapted to open as soon as the arm of the scale beam carrying the pivoted tray begins to descend, and the other of said contacts being opened whenever the beam-carrying column is lowered, filling hoppers, a flange at the upper edge of each of the filling hoppers, the flanges being formed with two notches diametrically opposite to one another, a table on which the weighing apparatus is mounted, the table top being formed with an aperture through which the weighed material is discharged, and means for suspending a filling hopper beneath the aperture in the table top in a readily detachable manner, said suspending means comprising a headed projection, such as a screw, extending downwards from the table top and adapted to engage with one of the notches in the flange of a filling hopper, a ring extending downwards from the table top and adapted to pass through the other notch in the flange of the filling hopper, and a pivotally mounted locking member adapted to be passed through said ring after the ring has been passed through the notch, so as to lock the filling hopper in position.

19. Automatic weighing and package-filling apparatus, comprising a table on which the weighing apparatus is mounted, levelling screws in the feet of the table for levelling the table top, plug sockets in the table top, a weighing box, plugs secured to the under side of the weighing box, said plugs being adapted to be removably inserted in the sockets in the table top, both for positioning purposes and for establishing electrical connections, a scale-beam, a vertically movable column carrying the scale beam, a scale pan suspended from one arm of the scale beam, a chute for supplying material to be weighed to the scale pan, resilient means constantly tending to urge the beam-carrying column upwards, means for lowering the beam-carrying column, a magnetic hammer for vibrating the chute, a hammer box enclosing the magnetic hammer, a hammer box being supported upon the table top independently of the weighing box, and the chute being pivoted at its rear end to the front wall of the hammer box, and plug cables for establishing electrical communication between the weighing box and the hammer box, the electric circuit of the hammer including two contacts in series, one of said contacts being adapted to open as soon as the arm of the scale beam carrying the pivoted tray begins to descend, and the other of said contacts being opened whenever the beam-carrying column is lowered.

In testimony whereof I have signed my name to this specification.

OSWALD BRUNO FOERSTER.